Oct. 26, 1954
W. J. MILLER ET AL
2,692,625
MACHINE FOR APPLYING TACKING STRIPS TO
MULTIPLE PIECE WOODEN CORES
Filed Aug. 9, 1950
4 Sheets-Sheet 2
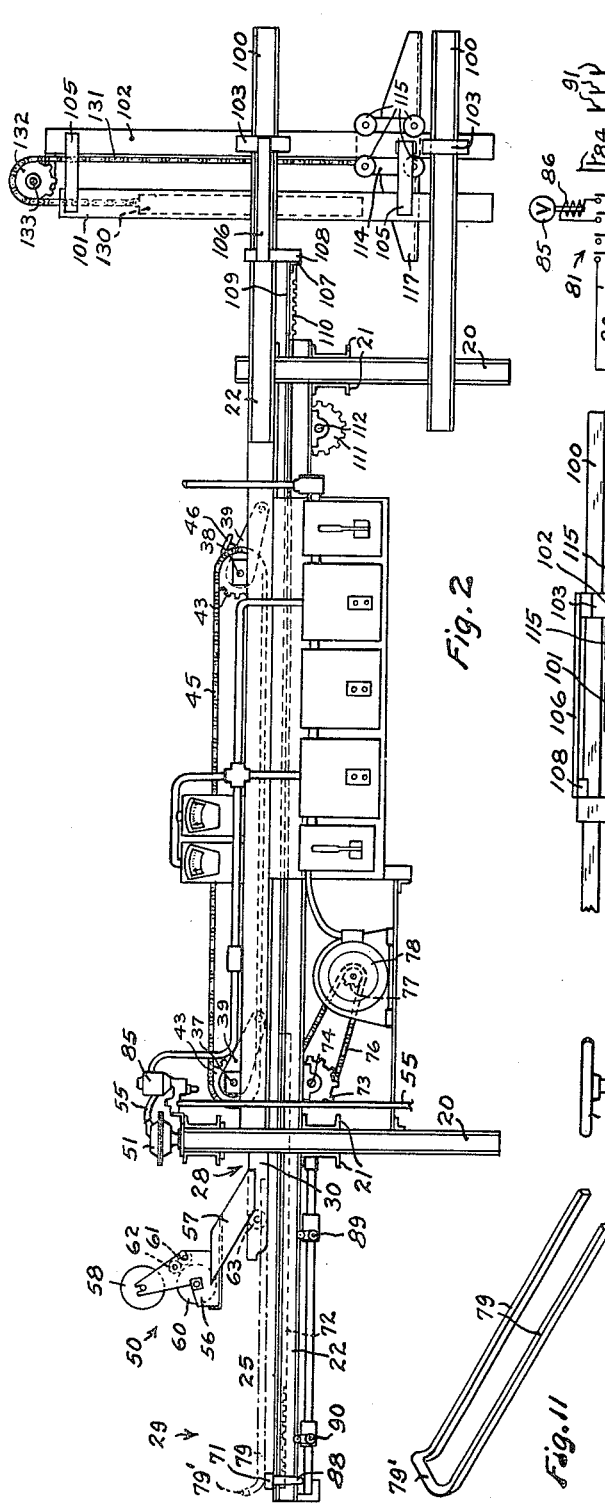
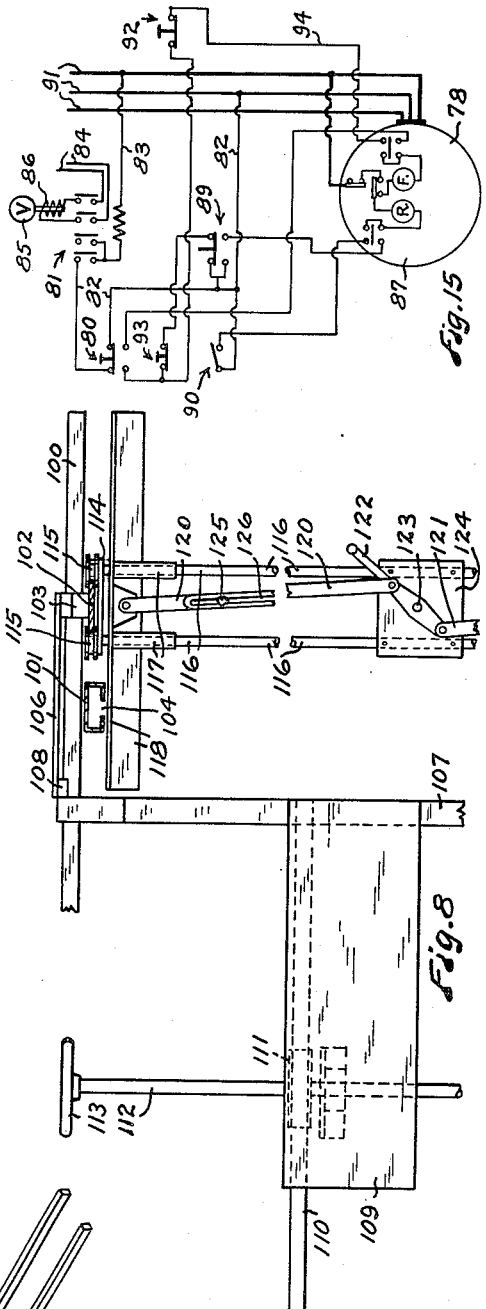
INVENTORS
William J. Miller
BY Alfred C. Johnson
Fred C. Matheny
ATTORNEY Oct. 26, 1954     W. J. MILLER ET AL     2,692,625
MACHINE FOR APPLYING TACKING STRIPS TO
MULTIPLE PIECE WOODEN CORES
Filed Aug. 9, 1950     4 Sheets-Sheet 3
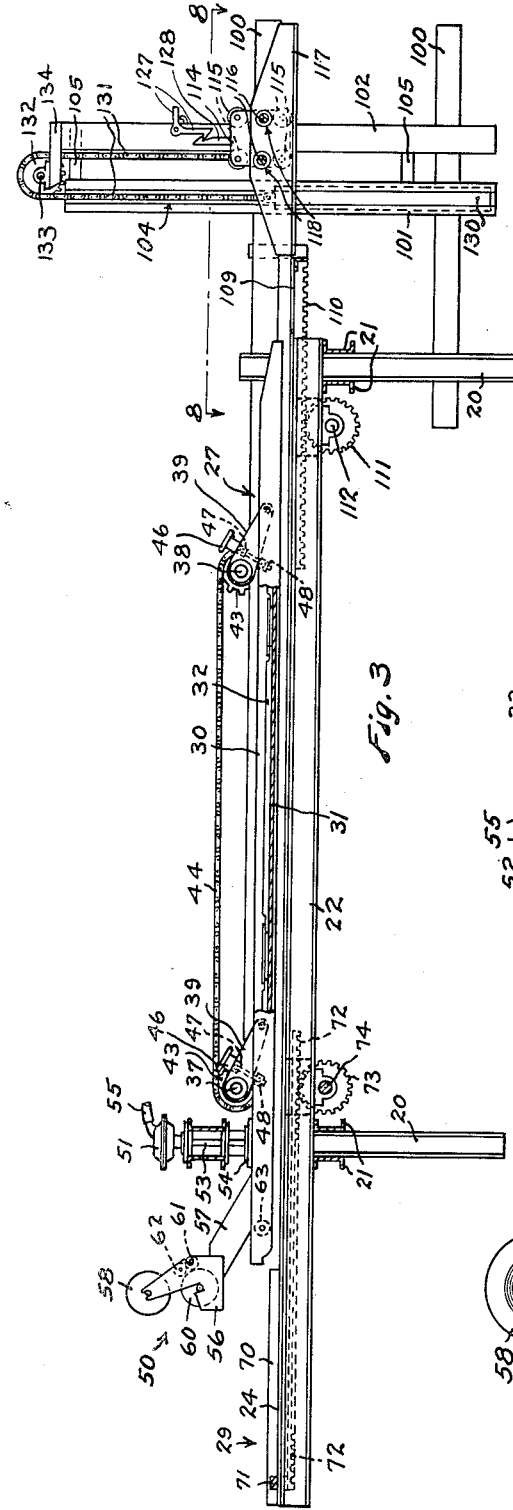
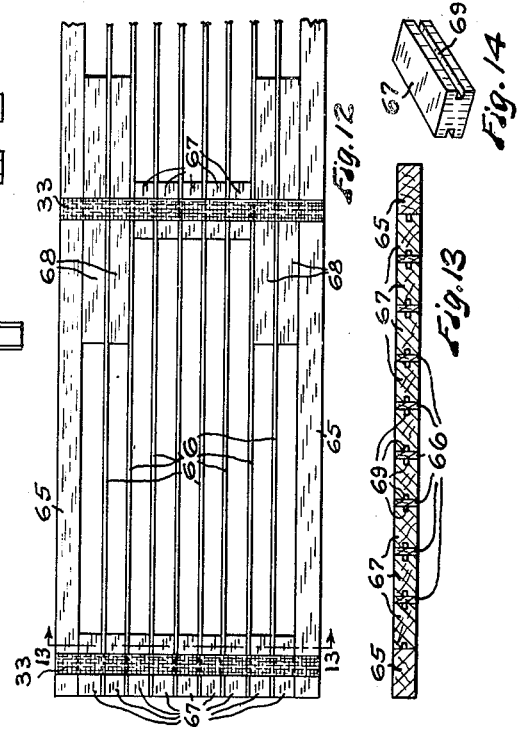
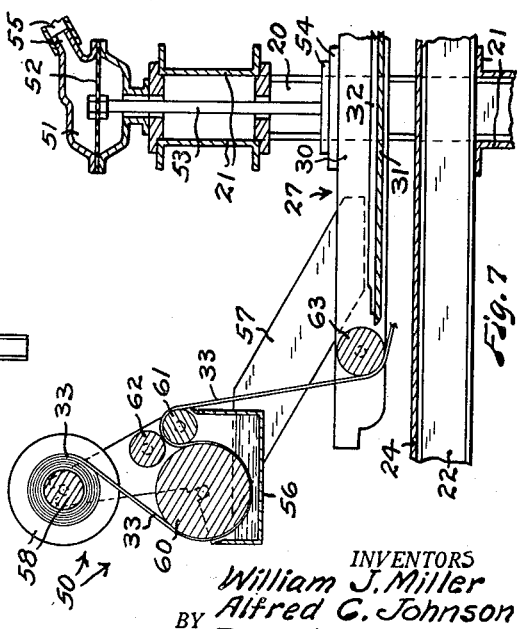
INVENTORS
William J. Miller
Alfred C. Johnson
BY
Fred C. Matheny
ATTORNEY

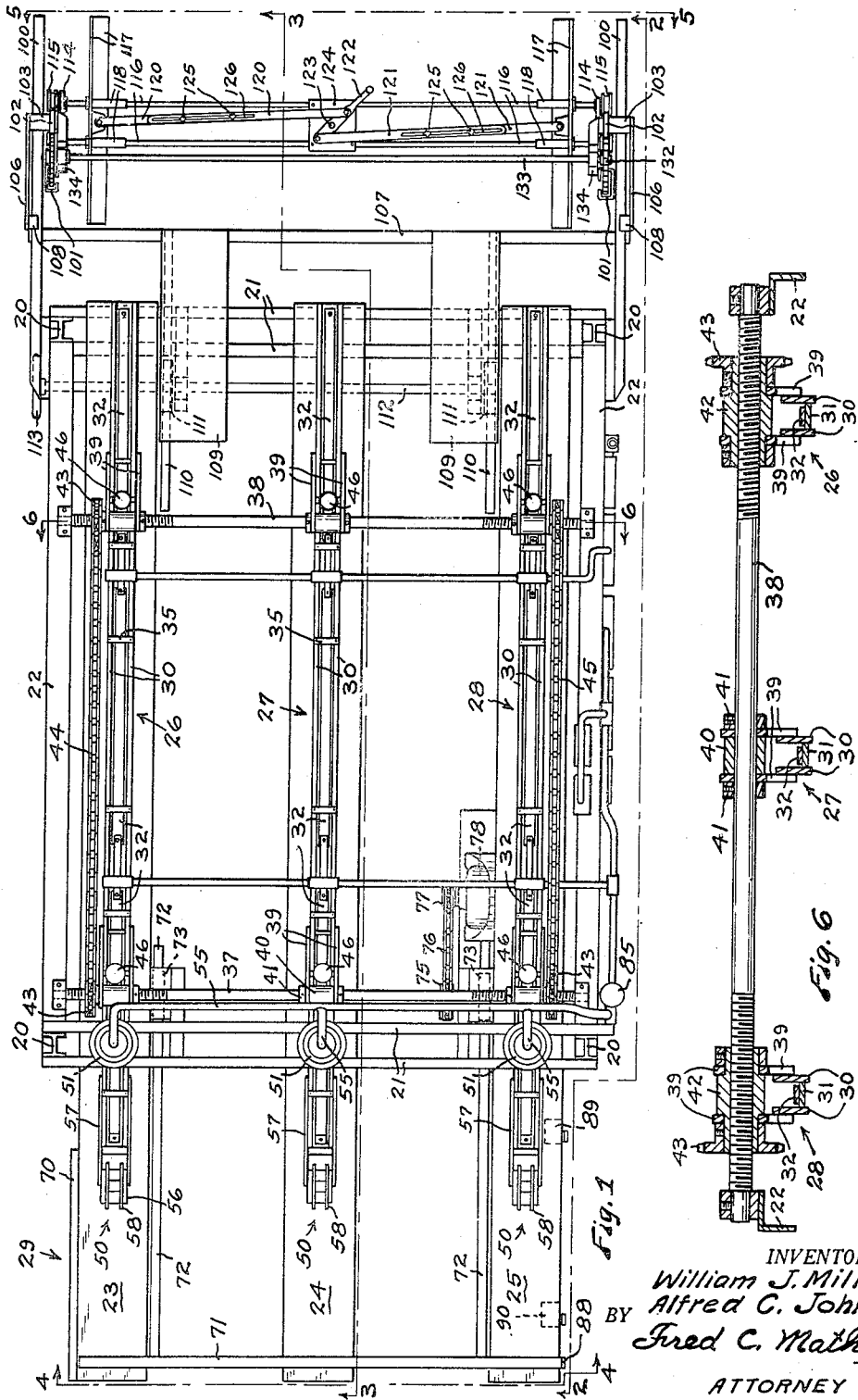

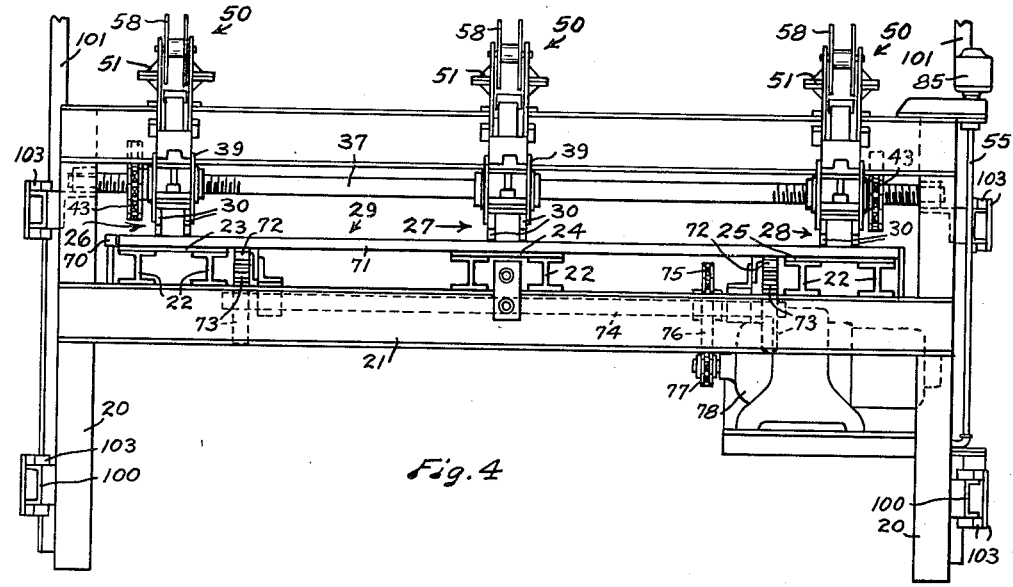
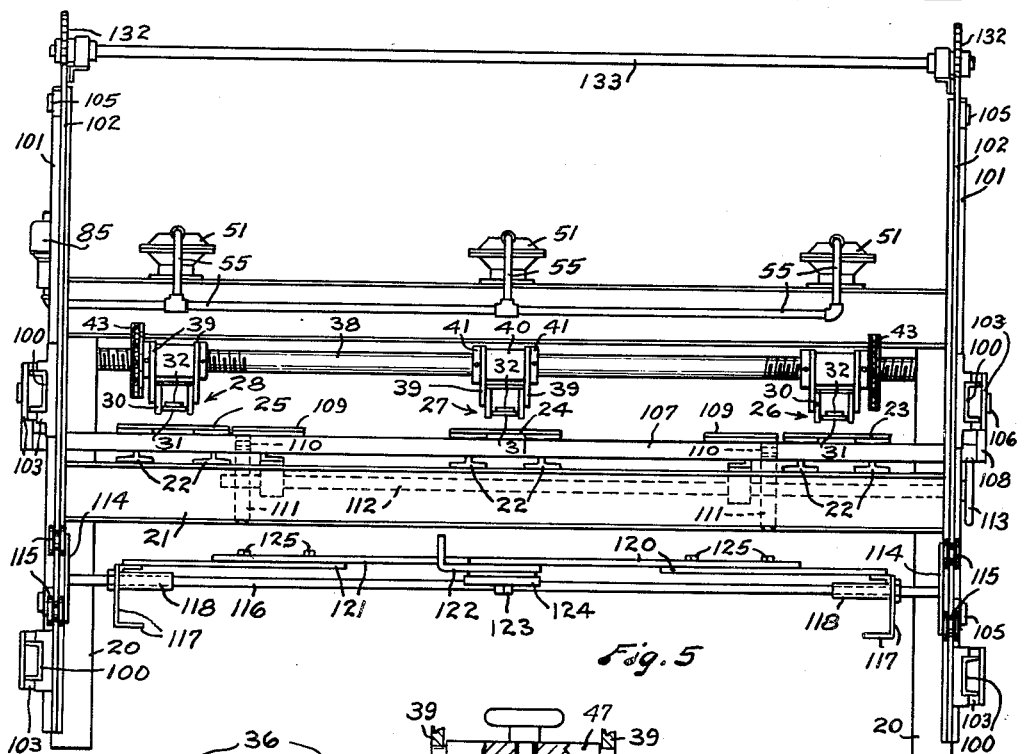
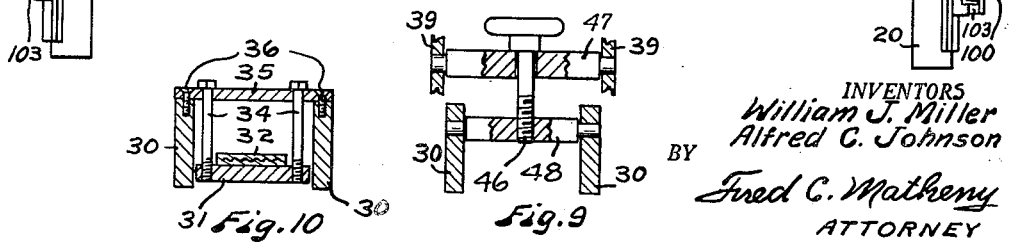
INVENTORS
William J. Miller
Alfred C. Johnson
BY Fred C. Matheny
ATTORNEY Patented Oct. 26, 1954

2,692,625

UNITED STATES PATENT OFFICE 2,692,625

MACHINE FOR APPLYING TACKING STRIPS TO MULTIPLE PIECE WOODEN CORES

William J. Miller and Alfred C. Johnson, Seattle, Wash., assignors to Elliott Bay Mill Co., Seattle, Wash., a corporation of Washington Application August 9, 1950, Serial No. 178,478

5 Claims. (Cl. 144—279)

This invention relates to a core glue tacker of a type designed to fasten together a plurality of pieces of wood or like material so that they may be readily handled and used as a core or center ply to which sheets of veneer or like facing material may be glued.

If a core or medial ply of a veneer panel is made up of a plurality of pieces of wood of substantial thickness which are edge glued together then unequal stresses are liable to be set up in the core to such an extent as to cause warping or twisting of the finished panel. In accordance with this invention the several pieces used in a core are not edge glued together but are left free so that each piece may function as an individual structural member and cumulative stresses in the core are avoided.

An object of this invention is to provide a simple and efficient machine for use in connection with cores which are made up of a plurality of strips or pieces of wood or like material and in which the several pieces which are used to make up each core are tacked together so that the core can be handled as a unit in the processes of manufacture but in which the several core pieces are not edge or face glued together but are left free to function as individual strips or pieces in finished panels which are made by gluing surface sheets, such as wood veneer, to said strips or core pieces. This provides a panel in which warping, due to internal stresses is eliminated.

Another object of this invention is to provide a machine which will tack and temporarily secure together a plurality of pieces of material by gluing or adhesively securing to said core pieces a plurality of strips of thin cotton gauze of sufficient strength to hold the pieces together while the cores are being handled in the processes of manufacture but which will break apart readily if they are subjected to substantial tension, as when panels using the cores are placed in a press to cure and set the glue after surface veneers have been applied to the cores.

Another object is to provide a core glue tacking machine for tacking together assembled pieces of material to form cores, which comprises track means to support the cores, pressure and heating shoes above the track means to hold the assembled core pieces in proper alignment and to cure the glue on tacking strips which are laid on the cores, means at the infeed end of the machine to facilitate assembly of the cores, means to push the assembled cores through the machine and means at the outfeed end portion of the machine to facilitate removal and stacking of the finished cores.

Other objects of the invention are to provide a machine which is simple in construction, easy to operate and one which will facilitate rapid and economical production of tacked together cores which are to be used in making up veneered articles.

Other objects of the invention will be apparent from the following description taken in connection with the accompanying drawings.

In the drawings:

Figure 1 is a plan view of a core glue tacker constructed in accordance with this invention.

Fig. 2 is a side elevation of the same looking in the direction of broken line 2—2 of Fig. 1.

Fig. 3 is a view partly in elevation and partly in section taken substantially on broken line 3—3 of Fig. 1.

Figs. 4 and 5 are end elevations respectively looking in the directions of broken lines 4—4 and 5—5 of Fig. 1 and on a larger scale than Fig. 1.

Fig. 6 is a detached view, partly in section and partly in elevation, taken substantially on broken line 6—6 of Fig. 1 and showing one of the cross shafts from which a plurality of pressure and heating shoes are adjustably and floatingly supported.

Fig. 7 is a view partly in section and partly in elevation showing a glue applicator for applying glue to a gauze strip and showing pressure means for applying pressure to the forward end portions of shoes under which cores pass.

Fig. 8 is a fragmentary view partly in plan and partly in section, taken substantially on broken line 8—8 of Fig. 3, and on a larger scale than Fig. 3 and showing parts of the stacking carriage at the discharge end of the machine.

Fig. 9 is a detached sectional view on a larger scale than the other views showing parts of the pressure and heating shoe devices.

Fig. 10 is a detached fragmentary view, partly in elevation and partly in section, showing pressure and heating shoe suspending and supporting means.

Fig. 11 is a detached perspective view showing a pressure shoe extension member.

Fig. 12 is a fragmentary plan view showing a core of a type to which tacking strips may be applied by the use of this machine.

Fig. 13 is a sectional view through said core, taken substantially on broken line 13—13 of Fig. 12 and on a larger scale than Fig. 12.

Fig. 14 is a detached perspective view of one of the shorter spacer blocks used in the core shown in Figs. 12 and 13.

Fig. 15 is a wiring diagram showing electrical control means used in connection with the machine.

Like reference numerals designate like parts throughout the several views.

This machine comprises a frame which includes upright leg members 20, transverse frame bars 21 and longitudinally extending frame bars 22, all of which may be formed of structural steel.

Preferably three sets of the longitudinal frame bars 22 are provided, one at each side of the machine and one set substantially midway between the two sides of the machine. Three plane flat track plates 23, 24 and 25 are supported on and secured to the three respective sets of longitudinal frame bars 22. These track plates extend longitudinally of the machine in transversely spaced apart parallel relation to each other and serve as supports for material which is being fed through the machine.

The frame bars 22 and track plates 23, 24 and 25 overhang at the intake end portion of the machine, shown at the left in Figs. 1, 2 and 3, so that they form a feed table at which operators can work in assembling cores. This feed or work table is designated generally by 29. The cores which are laid up on the feed table 29 pass through the machine and are tacked together so they can be handled as units rather than as individual pieces.

Three longitudinally extending electrically heated pressure and heating shoes, indicated generally by numerals 26, 27 and 28, are positioned above the respective track plates 23, 24 and 25 and cooperate with the said track plates to receive and hold therebetween the pieces of core forming material which are being fed through the machine.

Each electrically heated shoe, 26, 27 and 28, see Figs. 1, 2, 3, 6 and 10, comprises two horizontally spaced apart parallel metal side members 30 between which a metal heater plate 31 is disposed. Each heater plate 31 carries a plurality of strip type electric heating elements 32 disposed in end to end relation on the top side of the heater plate. The lowermost surface of each heater plate 31 is elevated a short distance above the plane of the lower edges of the two side members 30 between which it is disposed. This prevents the heater plates 31 from contacting and riding on gauze tacking strips 33, Figs. 7 and 12, which are used to temporarily secure together the strips or pieces of material of which the cores are made.

One way of supporting the heater plates 31 is to suspend them by means of bolts 34, Fig. 10, which pass through cross bars 35 and are threaded into the plates 31. The cross bars 35 rest on the top edge portions of the shoe members 30 and can be secured to members 30 by screws 36.

All of the pressure shoes 26, 27 and 28 are floatingly supported from two cross shafts 37 and 38 by inclined lever arms 39. The lever arms 39 which support the medial pressure shoe 27 have hubs 40 which rotatively receive the shafts 37 and 38, see Fig. 6. These medial lever arms 39 are prevented from moving longitudinally of the shafts 37 and 38 by set collars 41. The lever arms 39 which support the two lateral pressure shoes 26 and 28 have internally threaded rotatable hubs 42 which interfit threaded portions of the shafts 37 and 38 so that rotation of the hubs 42 will transversely adjust said hubs 42 and the lever arms 39 and pressure shoes 26 and 28 which are supported by said arms. The shafts 37 and 38 are non-rotatively supported by the frame of the machine. Preferably the threads on shafts 37 and 38 are right hand threads adjacent one side of the machine and left hand threads adjacent the other side of the machine. When the shafts are thus threaded it will be apparent that rotation of all of the hub members 42 in one direction will move the two pressure shoes 26 and 28 toward each other and rotation of all of said hub members in an opposite direction will move said two pressure and heating shoes 26 and 28 away from each other. The medial pressure shoe 27 usually does not need to be transversely adjusted but it can, if necessary, be transversely adjusted by adjustment of the set collars 41.

Preferably the threaded hubs 42 extend rotatively through the lever arms 39 and have sprocket wheels 43 secured thereto. The two sprocket wheels 43 adjacent the pressure shoe 26 are connected with each other by a link belt 44 and the two other sprocket wheels 43 adjacent the pressure shoe 28 are similarly connected with each other by a sprocket chain or link belt 45. These link belt connections insure equal transverse adjustment in either direction of the two end portions of each of the respective shoes 26 and 28. Thus the pressure and heating shoes 26, 27 and 28 are always maintained parallel. The link belts 44 and 45 may be operated to transversely adjust the pressure shoes 26 and 28 by manually grasping and moving said link belts. Obviously either shoe 26 or 28 may be independently adjusted or moved in either direction.

An adjusting screw 46, Fig. 9, is used to provide, between each lever arm 39 and an adjacent portion of the pressure shoe with which the lever arm 39 is connected, a suspension means which will limit the downward movement toward the adjacent track of the pressure and heating shoe but will permit said shoe to be moved upwardly. This is accomplished by having each adjusting screw 46 rotatively and slidably disposed in a yoke 47 which is pivotally supported by the adjacent lever arms 39 and threaded into another yoke 48 which is pivotally connected with the adjacent side members 30 of a pressure and heating shoe.

A glue and gauze dispensing unit designated generally by 50 is mounted on the forward end portion of each pressure and heating shoe. These units 50 are more fully hereinafter described.

Pneumatic means, see Fig. 7, for exerting a down pressure on the forward end portion of each shoe 26, 27 and 28 is positioned adjacent to and just beyond each glue and gauze dispensing unit 50, as respects the direction of travel of the cores in the machine. Each pneumatic pressure means comprises an air tight diaphragm housing 51 having a flexible diaphragm 52 therein. A downwardly extending piston rod 53 is secured to each diaphragm 52 and is arranged to exert a pressure, as through cross plate means 54, on the forward end portion of the adjacent pressure and heating shoe. Air under pressure is supplied to each housing through conduit means 55. An electrically actuated valve 85 is provided in the conduit means 55 to control the supply of compressed air to and the exhaust of compressed air from the diaphragm housings 51 as hereinafter explained in connection with the wiring diagram shown in Fig. 15. This air control means is synchronized with the operation of the machine and is controlled by an operator at the forward end of the machine.

The pneumatic devices described in the preceeding paragraph yieldingly urge the forward end portions of the floatingly supported shoes 26, 27 and 28 downwardly onto the cores when the cores are stopped and not moving in the machine but do not exert downward pressure when the cores are being moved, as hereinafter explained. The weight of the shoes 26, 27 and 28 always rests on the cores and the shoes are thus urged downwardly by gravity onto the cores at all times.

Each glue and gauze dispenser, as best shown in Fig. 7, comprises a glue receptacle 56 secured by bracket means 57 to the forward end portion of a pressure shoe. A roll of strip gauze 33 is supported on a reel 58. This gauze is diagrammatically shown in Fig. 7 and the thickness of the same is essentially much exaggerated in this showing. This gauze is a thin cloth mesh through which the glue will freely pass and which is so thin it will not cause any appreciable bulging of a facing sheet which is later applied to a core over this gauze. The gauze extends downwardly from the reel 58 into the glue receptacle 56 and under and around a large applicator roll 60, thence upwardly and out of the glue receptacle 56 between two wringer rolls 61 and 62. From the wringer rolls 61 and 62 the gauze 33 extends downwardly under and around a small applicator roll 63 which is rotatively mounted between the two side members 30 of an adjacent shoe. The wringer rolls 61 and 62 remove excess glue from the gauze 33 and the applicator roll 63 presses and rolls the gauze down onto the core material which is passing under said applicator roll 63. The strip of gauze 33 is thus adhered to the cores or core material and moves with the same and the gauze is positioned between the two side members 30 of the shoes and does not extend under the lower edge portions of the side members 30. The lower edge portions of the side members 30 ride on the core material and hold the same level but do not ride on the gauze strips. The gauze strips 33 are in close proximity to the heating plates 31 as they progress through the machine by intermittent advance movements and the heat from the heating elements 32 is conducted through the plates 31 and cures the glue while the cores are being advanced step by step through the machine.

One satisfactory way of supplying cores to the machine is to manually assemble such cores on the feed table 29 at the head end of the machine. One type of core satisfactory for making a veneer panel suitable for use as an inside door is shown in Figs. 12 and 13 and it will be understood that core forming stock may be assembled in many other forms. Scrap lumber and heart stock can be used to advantage in making up the cores thus conserving wood and holding down construction costs.

The rectangular core shown in Figs. 12 and 13 comprises two side stiles 65, a plurality of relatively narrow, spaced apart, longitudinal slats or strips 66, a plurality of relatively short spacer blocks 67 and a plurality of longer spacer blocks or strips 68. These members 65, 66, 67 and 68 are all of equal thickness from face to face of the core and are assembled in the manner shown in Figs. 12 and 13 to provide a core of uniform thickness. The core forming material, as illustrated in Fig. 12 is continuous and solid across both ends of the core and across the medial portion of the same. Thus three places are provided at which the core may be tacked by the use of the gauze strips 33. Obviously this machine may be constructed and operated so that it will tack a panel at more than three locations or at less than three locations. The positions in which one tacking strip is applied near the end of the core and one substantially mid way of the length of the core are shown in Fig. 12 and it will be understood that the end portion of the core which is broken away in Fig. 12 is similar to the end thereof which is shown.

Preferably each of the blocks 67 and 68 have edge grooves 69 provided in both edges thereof to insure ventilation within the finished panel. Also large air spaces are provided within the panel between the slats 66 except at the locations of the spacer blocks 67 and 68. This provides a hollow panel which is well adapted to serve as a door for inside use. The longer blocks 68 provide substantial bodies at the locations where door locks and latches are ordinarily installed.

The panels or cores are laid up or assembled on the feed table with one end portion of the core abutting a fixed line up bar 70 and with the trailing edge portion of the panel abutting or positioned against a movable feed bar 71. The feed bar 71 and line up bar 70 are at right angles to each other and help facilitate a proper squaring up of the pieces which go to make up the core.

Movement of the feed bar 71 to the right, as respects the showing in Figs. 1, 2 and 3, will advance a previously laid up core into a position between the pressure and heating shoes 26, 27 and 28 and the track plates 23, 24 and 25. Also it will, at the same time, push and feed forward all of the cores or core stock in the machine in advance of the core which is being introduced. This will bring the core near the discharge end of the machine into a position for discharge, as hereinafter explained. The gauze strips 33 are laid down continuously on the cores and these gauze strips have to be cut along the trailing edge of a core before the core can be removed from the discharge end portion of the machine.

The means herein disclosed for moving the feed bar 71 comprises two rack bars 72 secured to the feed bar 71 and extending toward the discharge end of the machine and positioned alongside of the inner edge portions of the two track plates 23 and 25 respectively. The rack bars 72 are suitably guided for longitudinal movement and have downwardly directed rack teeth which engage or mesh with pinions 73 on a cross shaft 74. The cross shaft 74 has a driving connection by means of a sprocket wheel 75, link belt 76 and sprocket pinion 77 with a reversable electric motor 78. Speed reduction gear means may be incorporated into the construction of the motor 78.

After a core has been laid up on the table 29 and before movement of the core toward the pressure shoes is instituted two slidably disposed pressure shoe extension members 79, Figs. 2 and 11, are manually pulled out and laid on the core adjacent the respective end portions of said core to serve as hold down members for the pieces of material in the core while said core is being moved under the pressure and heating shoes 26, 27 and 28. The pressure shoe extension members 79 fit slidably over the shoes 26 and 28 beneath the ends of the brackets 57, Fig. 2, and rest on the cores at all time when cores are in the machine. The members 79 are thus held in alignment with the shoes 26 and 28 and will move with the incoming core as it is advanced into the machine. After a new core has been laid the members 79 are manually drawn outwardly in prolongation of the shoes 26 and 27 and rest on the new core but are not entirely disengaged from the shoes 26 and 27. One of the pressure shoe extension members 79 is diagrammatically shown in Fig. 2 by dot and dash lines in a position similar to the position it would occupy when first pulled out on a core and before feeding movement of the core had been started. A similar member 79 is shown in perspective in Fig. 11. These pressure shoe extension members 79 straddle the two pressure and heating shoes 26 and 28 at the respective sides of the machine and are guided by said shoes 26 and 28 and the weight of these members 79 helps to prevent upward bulging of the assembled parts of the cores during their initial movement and before they are under the pressure and heating shoes. Preferably hand hold means 79' is provided on the forward end portion of each extension member 79. Downward pressure on the forward end portions of the shoes 26, 27 and 28, by the pneumatic means is released while a core is being moved into the machine but the incoming core is pushing or advancing all of the other cores in the machine and for this reason it is desirable to provide the extension members 79 to serve as weights and hold down the assembled pieces in the core which is being introduced. The extension members move inwardly with the new core and remain in an inward position straddling the shoes 26 and 28 while the next core is being laid up.

After the pressure shoe extension members 79 have been properly positioned on a laid up core a switch 80 at the forward end of the machine, see Fig. 15, is manually actuated. Movement of this switch 80 will first break a circuit to a valve control relay 81. This circuit is formed in part by conductors 82 and 83. The breaking of the circuit to relay 81 will actuate said relay 81 in such a manner as to cause it to admit current from a source 84 to a coil 86. This will position a valve 85, see also Figs. 1 and 2, so as to shut off the supply of air under pressure through air conduit means 55 to the three diaphragm housings 51 and will open these housings to exhaust. The relief of pressure in diaphragm housings 51 relieves the downward pressure on the forward end portions of the pressure and heating shoes 26, 27 and 28 and makes it possible to feed a freshly laid up core under said shoes and to advance the cores which are already under said shoes. Further movement of switch 80 will close a circuit to the reversing starter mechanism 87 of the motor 78. This will energize the motor 78 and institute movement of the feed bar 71 and advance all of the cores in the machine toward the discharge end of the machine. The switch 80 will return to its initial position as soon as it is released. When the feed bar 71 reaches a position far enough to the right, as respects the showing in Fig. 2, a trip arm 88 on said feed bar 71 will engage with and operate a limit switch 89. The operation of the limit switch 89 will reverse the motor 78 and will close a circuit by way of the switch 80 to the valve controlled relay 81. This will operate valve 85 and disconnect the diaphragm housings 51 as respects exhaust and connect said housings 51 with a supply of air under pressure. Thus pressure will be applied to the forward end portions of the pressure and heating shoes at substantially the same time advance movement of the cores in the machine is stopped. The reversing of the motor 78 will quickly return the feed bar 71 to its starting position, in which it is shown in Figs. 1, 2 and 3.

As the feed bar 71 nears its starting position on its return stroke the trip arm 88 will engage with and operate another limit switch 90 and stop the motor 78. Electric current of suitable voltage for the operation of the motor 78 is supplied by way of conductors 91.

Two manually operated emergency switches 92 and 93 are connected with the reversing starter means 87 of the motor 78 by circuit means including conductor 94. These emergency switches are positioned at opposite ends of the machine and make it possible for operators at either end of the machine to instantly stop the motor 78 in case of an emergency.

Preferably the electric heaters 32 are supplied with electric current by circuit means independent of the above described control circuit means.

The core stock in the machine will be advanced one step each time a freshly assembled core is fed in and will then remain stationary until another core has been made ready. This provides intermittent feeding of the cores. Applicants have found that the glue can be satisfactorily cured if each core is allowed about three minutes time under the pressure and heating shoes and that the machine can be conveniently fed at about this rate.

Each time a new core is fed into the machine a similar core on which the glue has been cured will be discharged. Adjustable stacking carriage mechanism is provided to facilitate removal of the cores from the machine and is shown at the right in Figs. 1, 2 and 3. Also this stacking mechanism is shown in Figs. 5 and 8. Preferably this adjustable stacking mechanism is slidably supported on two pairs of horizontal track bars 100 disposed at opposite sides of the machine. The two bars 100 of each pair are vertically spaced apart, are parallel, are rigidly secured to the main frame of the machine and extend horizontally outward from the discharge end portion of the machine.

Two parallel, spaced apart, upright carriage track members 102 are adjustably supported from the track bars 100 at opposite sides of the machine. Each upright carriage track member 102 is herein shown to be a flat metal bar or plate which is slidably supported on the horizontal track bars by bracket means 103. Each upright carriage track member 102 carries an upright counterweight housing 101 which is secured to the member 102 by horizontal bars 105. The counterweight housings are generally rectangular in cross section and are hollow and preferably have slots 104 longitudinally disposed in their inner sides.

The upper bracket means 103 of each carriage track 102 has a horizontal side bar 106 rigidly secured thereto. Each side bar 106 extends parallel to the adjacent track bar 100 toward the front end of the machine and past the adjacent counterweight guide 101. A tie bar 107 extends crosswise of the machine and has its respective end portions connected by short upright bars 108 with the forward end portions of the side bars 106. Two skid plates 109 are secured to the tie bar 107 and extend toward the forward end of the machine. Two rack bars 110 are secured to the lowermost sides of the skid plates 109 and to the tie bar 107 and extend beyond the forward ends of said skid plates and engage with gear-wheels or pinions 111 by which they may be moved to adjust the stacking carriage toward or away from the discharge end of the frame. The pinions 111 are secured to a transverse shaft 112 which may be manually turned by a handwheel 113 to adjust the position of the stacking carriage. The skid plates 109 serve as supports for the discharging cores after the cores have passed beyond the ends of the track plates 23, 24 and 25.

Two vertically movable carriage units each comprising a carriage plate 114 and a plurality of grooved rollers 115 are mounted on the upright carriage tracks 102. The two carriage plates 114 at opposite sides of the stacking carriage are connected with each other by two spaced apart parallel transverse rods 116. Two core supporting plates 117 of angle shaped cross section are each provided with two guide tubes 118 which are slidably disposed on the guide rods 116. The core supporting plates 117 serve to receive and support the cores and to lower said cores onto a core stack on any suitable transfer means by which the cores can be taken away.

Two shifter bars 120 and 121 respectively are pivotally connected with the two core supporting plates 117 and extend toward each other. The adjacent end portions of the two shifter bars 120 and 121 are pivotally connected with a shifter lever 122. The lever 122 is mounted on a fixed pivot 123 which is positioned between the points of connection of the two shifter bars 120 and 121 with said lever 122. A plate 124 is rigidly secured to the transverse rods 116 and supports the pivot member 123. Obviously angular movement of the lever 122 will move the two core supporting plates 117 toward and away from each other and this makes it possible to release a core after the core has been lowered onto a stack of cores.

Preferably each shifter bar 120 and 121 is of two part construction with the two parts thereof overlapped and adjustably connected together as by bolts 125 operating its slots 126. This makes it possible to adjust the length of the shifter bars 120 and 121 so as to take care of cores of different length.

Also preferably a latch member 127, Fig. 3, is pivotally mounted on one of the upright track bars 102 and is adapted to engage with a cooperating part 128 on the adjacent carriage plate to hold the vertically movable parts of the stacking carriage in a raised position after they have been raised to receive a core. The latch member 127 will automatically engage with the part 128 as the carriage moves upwardly and must be manually released in order to lower the stacking carriage.

Each carriage plate 114 is connected with a counterweight 130 as by a link belt 131 which passes over a sprocket wheel 132. Each sprocket wheel 132 is secured to a cross shaft 133 which is rotatively supported from the upper end portions of the track bars 100 by bearing bracket means 134. The sprocket wheels 132 are both secured to the shaft 133 and thus equal and parallel up and down movement of the carriage means at opposite sides of the stacking carriage is insured. The counterweights 130 are movably disposed in the housings 101.

In the operation of the stacking carriage said carriage is adjusted longitudinally of the machine on the track bars 100 to properly position it to receive cores of the predetermined width which are being fed to the machine. In this connection it will be understood that the width of cores which are being tacked may be varied from time to time and that the stacking carriage means must be correspondingly adjusted along the track bars 100. Each time the carriage means is raised the L-shaped lowering brackets 118 will stop with the horizontal flanges thereof flush with the track members 123, 124 and 125 and flush with the skid plates 109. Each time the cores in the machine are advanced a tacked together core will be pushed beyond and clear of the skid plates 109 and tie bar 107 and onto the L-shaped lowering brackets 117. When a core is thus pushed onto the lowering brackets 117 it will be connected with the next adjacent core by the continuous gauze strips 33 and the trailing edge of the discharging core will be positioned substantially flush with the ends of the skid plates 109 which are attached to the tie bar 107. An operator standing at the discharge end of the machine will cut the three strips of gauze between the discharging core and the next adjacent core. He will then unlatch the latch member 127, lower the brackets 117 and core supported thereby onto a transfer means or onto a stack of cores which rests on a transfer means and then move the lever 122 to spread the brackets 118 apart and release the core. The lowering carriage means, including the brackets 117, will then be returned to the elevated position, as shown in Fig. 3, preparatory to receiving the next core. It will be noted that this lowering carriage means is shown in a lowered position in Fig. 5.

The operation of this machine may be summarized as follows:

Suitable pieces of material from which cores are to be made are laid or assembled on the work table at the forward end of the machine. As fast as these cores are made up they are fed, by the feed bar 71, under the pressure and heating shoes 26, 27 and 28. This process is continuous but the movement of the cores is intermittent and these cores are pushed through the machine step by step. Each time a freshly assembled core is pushed under the pressure and heating shoes a core on which the glue is cured is pushed out from under said shoes and onto the stacking mechanism at the discharge end of the machine. Each discharging core is manually cut loose from the next core therebehind and is removed from the machine.

The foregoing description and accompanying drawings clearly disclose preferred embodiments of this invention but it will be understood that changes may be made within the scope of the claims.

We claim:

1. In a core glue tacker for tacking together assembled pieces of material to form a core, track means to support the core; a plurality of relatively long straight pressure and heating shoes positioned in adjacent parallel opposed spaced relation over said track means, each pressure shoe comprising two transversely spaced apart parallel pressure plates having spaced apart core engaging lower edge portions and having heating means positioned between said pressure plates and above the common plane of said core engaging lower edge portions; glue applicator tacking strip supply means positioned adjacent to the forward end portions of said shoes; and core feeding means operable to feed cores past said glue applicator and tacking strip supply means and between said shoes and said track means, whereby freshly glued tacking strips will be applied to said cores and will pass between the spaced apart pressure plates of each shoe below 2. In a core glue tacker for tacking together assembled pieces of material to form a core, track means to support a core; a plurality of relatively long straight pressure and heating shoes positioned in adjacent parallel opposed spaced relation over said track means; link means floatingly supporting said shoes adjacent to and above said track means, whereby said shoes will rest by gravity on cores when cores are between said shoes and said track means; valve controlled pneumatic means connected with the forward end portions of said shoes, whereby downward pressure may be exerted by said pneumatic means on the forward end portions of said shoes; glue applicator tacking strip supply means positioned adjacent to the forward end portions of said shoes; and reciprocable core feeding pusher bar means positioned to engage with cores and push said cores past said glue applicator and tacking strip supply means and between said shoes and said track means, whereby freshly glued tacking strips will be applied to said cores and the glue on said tacking strips will be cured by heat from said shoes.

3. In a core glue tacker for tacking together assembled pieces of material to form cores, track means to support cores; a plurality of relatively long straight pressure and heating shoes floatingly supported in adjacent parallel opposed spaced relation above said track means; glue applicator tacking strip supply means positioned adjacent the forward end portion of each of said shoes adapted to dispense a tacking strip through a bath of glue; valve controlled releasable pneumatic pressure means connected with the forward end portions of the respective shoes adapted to yieldingly urge said forward end portions of said shoes toward said track means; and core feeding means operable to feed cores past said glue applicator and tacking strip supply means and between said shoes and said track means, whereby freshly glued tacking strips will be applied to said cores and the glue on said tacking strips will be cured by the heat from said shoes.

4. In a core glue tacker for tacking together assembled pieces of material to form cores, core supporting track means; a plurality of relatively long straight pressure and heating shoes floatingly supported in adjacent parallel opposed spaced relation above said track means; glue applicator tacking strip supply means positioned adjacent the forward end portion of each of said shoes adapted to dispense a tacking strip through a bath of glue; a tacking strip roller carried by the forward end portion of each shoe and positioned to roll on a tacking strip which is passing under the shoe; a releasable pneumatic pressure device operatively connected with the forward end portion of each shoe adjacent the tacking strip roller which is carried by the shoe adapted to yieldingly urge the forward end portion of the shoe downwardly toward the track means, the shoes throughout their entire length being continuously urged by gravity against cores positioned thereunder irrespective of the operation of said pneumatic means; and core feeding means operable to feed cores past said glue applicator and tacking strip supply means and between said shoes and said track means, whereby said rollers will apply freshly glued tacking strips to the cores and the glue on said tacking strips will be cured by heat from said shoes.

5. In a core glue tacker for tacking together assembled pieces of material to form cores, a frame; horizontal track means on said frame to slidably receive cores; a plurality of relatively long straight pressure and heating shoes floatingly supported above said frame in adjacent parallel opposed spaced relation to said track means; said shoes terminating a substantial distance from the forward end of said track means to provide at the forward end of said frame a feed and assembly table; glue applicator tacking strip supply means positioned adjacent the forward end portion of each of said shoes adapted to dispense a tacking strip through a bath of glue; a reciprocable core feeding pusher bar disposed on said feed and assembly table and adapted to be positioned at the forward end of said table whereby cores may be assembled on the table in front of the bar; straight heavy extension shoes slidably fitting over the forward end portions of the pressure and heating shoes and movable into extended positions onto assembled cores to hold down the parts of said cores while the cores are being fed into the spaces between the shoes and the track means; and pusher bar moving means connected with said bar adapted to move said bar and push cores past said glue applicator and tacking strip supply means and between said shoes and said track means.

References Cited in the file of this patent

UNITED STATES PATENTS

| Number | Name | Date |
|---|---|---|
| 894,017 | Krebs | July 21, 1908 |
| 915,504 | Sutter | Mar. 16, 1909 |
| 921,618 | Murdoch | May 11, 1909 |
| 1,646,645 | Frederickson et al. | Oct. 25, 1927 |
| 1,702,185 | Weber | Feb. 12, 1929 |
| 1,958,845 | Burns | May 15, 1934 |
| 2,228,887 | Peterson | Jan. 14, 1941 |
| 2,371,331 | Irwin et al. | Mar. 13, 1945 |
| 2,407,070 | Frame | Sept. 3, 1946 |
| 2,453,185 | Bilhuber | Nov. 9, 1948 |
| 2,488,759 | Bolling | Nov. 22, 1949 |

FOREIGN PATENTS

| Number | Country | Date |
|---|---|---|
| 509,377 | Germany | Oct. 8, 1930 |